UNITED STATES PATENT OFFICE.

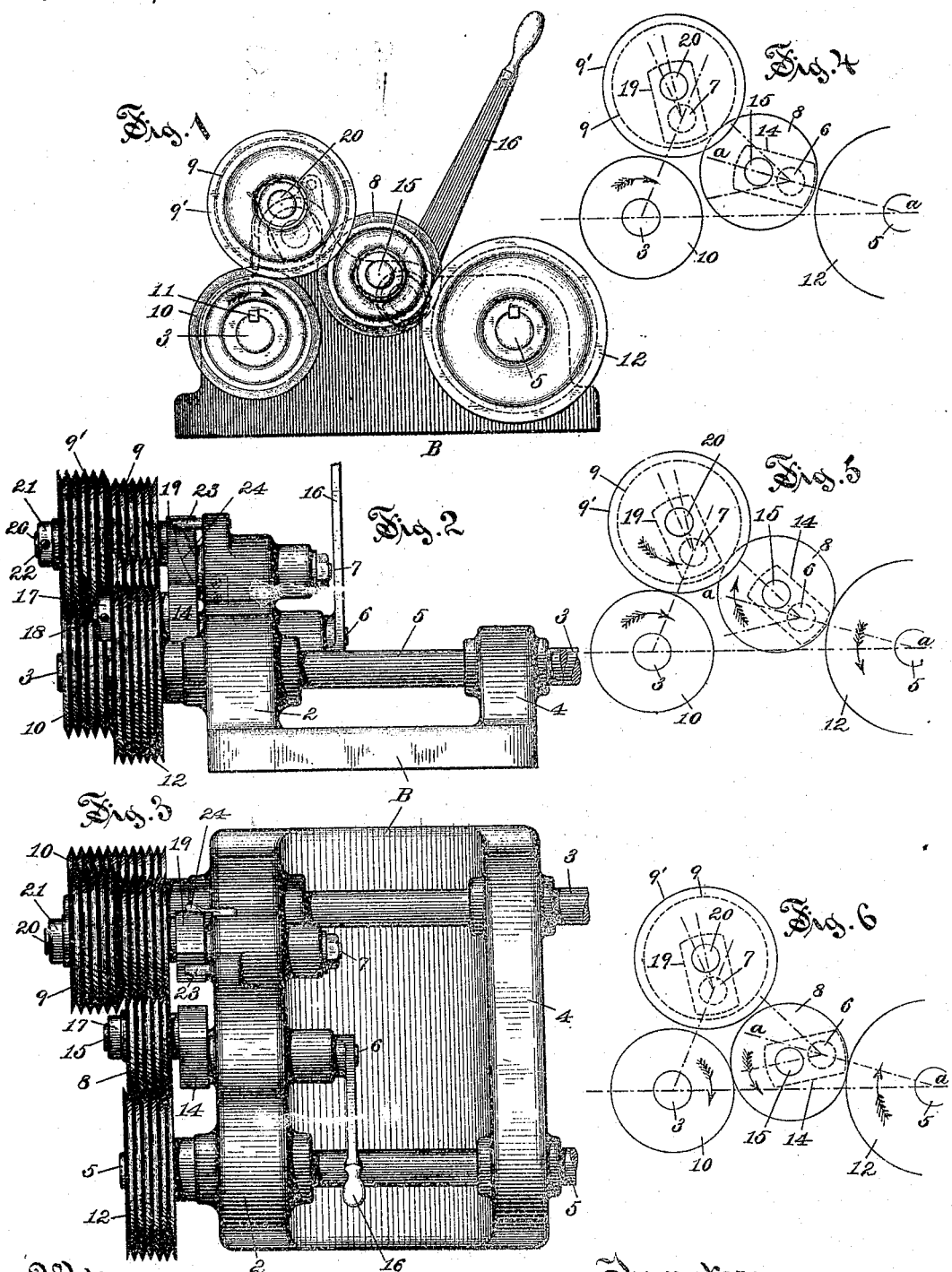

FRANCIS H. RICHARDS, OF HARTFORD, CONNECTICUT, ASSIGNOR TO ECKLEY B. COXE, OF DRIFTON, PENNSYLVANIA.

FRICTIONAL REVERSING-GEARING.

SPECIFICATION forming part of Letters Patent No. 446,927, dated February 24, 1891.

Application filed December 18, 1890. Serial No. 375,152. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Frictional Reversing-Gearing, of which the following is a specification.

This invention relates to frictional driving-gearing, the object being to furnish a system of frictional reversing-gearing organized for operating a driven shaft in either direction.

In the drawings accompanying and forming a part of this specification, Figures 1, 2, and 3 are respectively an end elevation, a side elevation, and a plan view, of a system of frictional reversing-gearing embodying my invention. Figs. 4, 5, and 6 are diagrammatic views illustrative of the operation of the mechanism.

Similar characters designate like parts in all the figures.

The mechanism is applicable to that class of machines wherein it is desirable to intermittently actuate a shaft in either direction. It comprises a driving-shaft carrying a friction gear or wheel fixed thereto, a driven shaft also carrying a friction-wheel fixed thereto, and two intermediate friction-wheels arranged for transferring motion from the driving-wheel to the driven wheel through one of said intermediates or through both of them.

The frame-work for carrying the operative details may be a part of the frame-work of any machine or apparatus in which my present improvement may be incorporated; or, if arranged as an independent mechanism, as herein shown, said frame-work may consist of any suitable bed or base, as B, provided with suitable bearings. The bed or frame-work B is provided with uprights, as 2 and 4, in which are journaled the driving-shaft 3 and the driven shaft 5. The upright 2 also has journaled therein the lever-provided crank-shaft 6, carrying the first or principal intermediate wheel 8, and the crank-shaft 7, carrying the second intermediate wheel 9. The driving-shaft 3 has fixed thereto by suitable means, as the key 11, the driving-wheel 10. This shaft and wheel are ordinarily to be continuously revolved in the same direction—as, for instance, in the direction indicated by the arrow on said wheel in Fig. 1. The driven shaft 5 has fixed thereto the driven wheel 12. The rock-shaft 6 has a crank-arm 14, carrying the stud or crank pin 15, on which the principal intermediate wheel 8 is fitted to freely revolve. Said wheel 8 may be held in place on the stud 15 by means of a collar 17 and a set-screw 18, as shown in the drawings. A suitable reversing-lever, as 16, is or may be fixed to the inner end of the shaft 6, whereby to actuate said shaft by hand. The shaft 7 has a crank-arm 19, (similar to arm 14,) which carries the crank pin or stud 20, on which the intermediate wheel 9 is fitted to freely revolve, said wheel being held in place on said stud by means of a collar 21 and set-screw 22, in a well-known manner. For limiting the movement of the shaft 7 in its bearing in one direction, a pin 23 is or may be fixed in the upright 2 of the frame-work, and a spring 24, provided to hold the arm 19 of said shaft normally in contact with said stop-pin, thereby holding the wheel 9 normally out of engagement with the wheel 10.

The wheel 9 is shown in the drawings having two diameters. The part 9' of larger diameter is designed to engage the wheel 10, and the part 9 of smaller diameter is designed to engage the wheel 8. This feature is used because of the use of grooved friction-wheels. Since the wheel 8 is required to mesh with each of the wheels 10, 9, and 12, of course the grooves of all these wheels must be in the same plane; but the wheel 9 must also mesh with the wheel 10, and this, except for the above-described expedient, would bring groove opposite groove, and thus render the wheels non-effective. Accordingly, said second intermediate wheel has two divisions or faces of different diameters and designated 9 and 9', respectively, the division 9' being grooved to correspond with the wheel 10 and the division 9 with the wheel 8. By this means the proper engagement of all the wheels is provided for.

The operation of the mechanism will be understood by comparison of the diagrammatic views, Figs. 4, 5, and 6. In Fig. 4 the intermediate wheels are shown disengaged from both the driving and the driven wheels, and the driven shaft 5 and its wheel 12 are supposed to be at rest, while the driving-shaft 3 and its wheel 10 are continuously revolving in the direction of the arrow thereon. If, now, the operator grasps the lever 16 and throws it over toward the right hand in Fig. 1, the parts moved thereby are thrown into the position shown in Figs. 1 and 5, wherein all of the wheels are in engagement and revolve each in the direction indicated by the arrow thereon. Should the operator throw the said lever 16 fully over to the left hand in Fig. 1, then the intermediate wheel 8 is brought directly into engagement with both of the wheels 10 and 12 and revolves in the direction shown in Fig. 6. When at any time the operator throws the lever 16 into a position intermediate to the two positions just described, then the intermediate wheels are brought into their idle positions, (shown in Fig. 4,) wherein both intermediates stand free from the driving and driven wheels, the driving-wheel 10 only revolving.

The action described is obtained by means of the organization of the mechanism, wherein the axes of the crank-shafts and the position and angular movement of the crank-arms are so related as to produce the described results on the proper turning of the crank-shafts. The arm 14, when in its intermediate position, stands in alignment with the line $a\ a$ through shafts 5 and 6, as shown in Fig. 4. On turning said arm 14 in either direction, as in Figs. 5 or 6, the crank 15 approaches the shaft 5 and brings the wheel 8 into engagement with the wheel 12 on shaft 5. When said arm 14 is thrown downward, as in Fig. 6, the wheel 8 is also and simultaneously engaged with the wheel 10, this wheel having been properly located for that purpose. When the arm 14 is raised, as in Fig. 5, the wheel 8, as before, is thrown into engagement with the wheel 12, but also and previously strikes the wheel 9, and through this wheel and by reason of the position of the arm 19, swings the crank 20 toward the left hand and downward, thereby bringing the wheel 9 into engagement also with the driving-wheel 10.

It will be understood that it is not essential to the general operation or function of the mechanism that the intermediate wheels be carried by cranks, as shown, if only they are supported to be movable in the direction and substantially as set forth; but the use of cranks for that purpose is deemed preferable because of the firm support and free action thereby obtained. It should also be understood that my improvement is not limited to the use of frictional gearing, since the same organization shown and described is operative with spur-gearing, provided, of course, that the depth of the teeth is suitably proportioned relatively to the throw of the wheels toward and from each other.

Having thus described my invention, I claim—

1. In reversing-gearing, the combination, with the driving and driven wheels, of the first intermediate wheel movably supported to be shifted in one direction into engagement with the driven wheel and to be shifted in the opposite direction into engagement with both the driving and driven wheels, and a second intermediate wheel movably supported, substantially as described, to be shifted on and by the first-named movement of the first intermediate wheel into engagement with the driving-wheel, whereby power may be transmitted from the driving-wheel to the driven wheel through one intermediate or through two intermediates.

2. In reversing-gearing, the combination, with the driving and driven wheels, of the first intermediate wheel carried on a crank, whereby it may be thrown into engagement with the driven wheel only or into engagement with both the driving and driven wheels, and the second intermediate wheel carried by a second crank supported to be actuated through its intermediate wheel from the first intermediate wheel, substantially as set forth.

3. In reversing-gearing, the combination, with the grooved driving and driven wheels, of the first and second intermediate wheels, means, substantially as described, movably supporting said intermediate wheels, the second intermediate wheel having two grooved faces, one for engaging the driving-wheel and the other for engaging the first intermediate wheel, substantially as described.

4. In reversing-gearing, the combination, with a suitable frame-work carrying the driving and driven shafts, of the driving-wheel on the driving-shaft and the driven wheel on the driven shaft, the crank-shafts 6 and 7, supported in said frame-work and carrying the first intermediate and second intermediate wheels, respectively, and means for operating said crank-shaft 6.

5. In reversing-gearing, the combination, with driving and driven wheels, substantially as described, of the first and second intermediate wheels, said second intermediate wheel being movably supported upon the crank 19, the stop-pin limiting said crank movement in one direction, and a spring normally holding said crank against said stop-pin.

FRANCIS H. RICHARDS.

Witnesses:
HENRY L. RECKARD,
H. MALLNER.